Oct. 17, 1944.  A. B. SEGUR  2,360,725
CUTTER FEED CONTROL MEANS FOR MACHINING APPARATUS
Filed Oct. 31, 1942  3 Sheets-Sheet 1

Inventor:
Asa B. Segur
By Foorman L. Mueller
Atty.

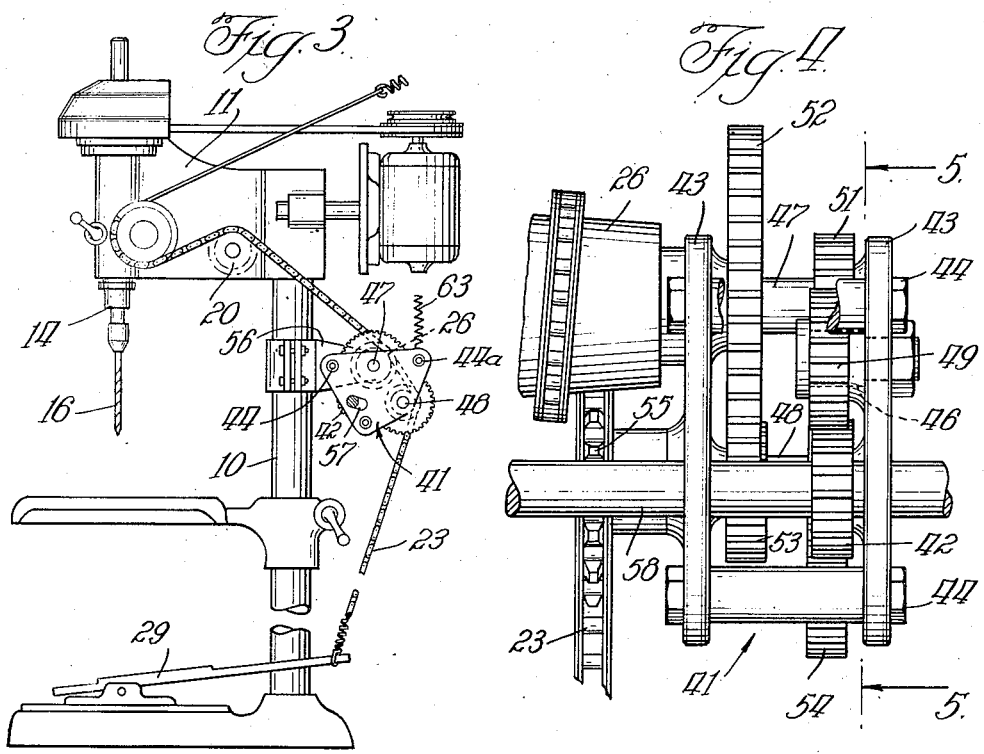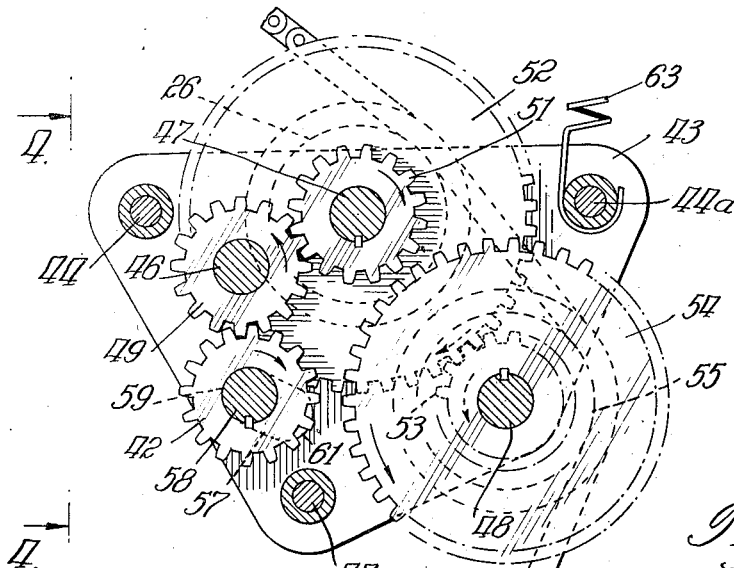

Oct. 17, 1944.   A. B. SEGUR   2,360,725
CUTTER FEED CONTROL MEANS FOR MACHINING APPARATUS
Filed Oct. 31, 1942   3 Sheets-Sheet 3
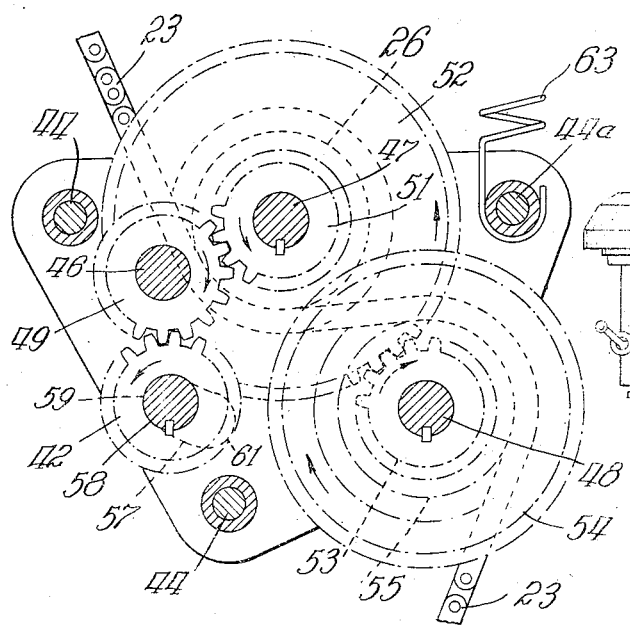
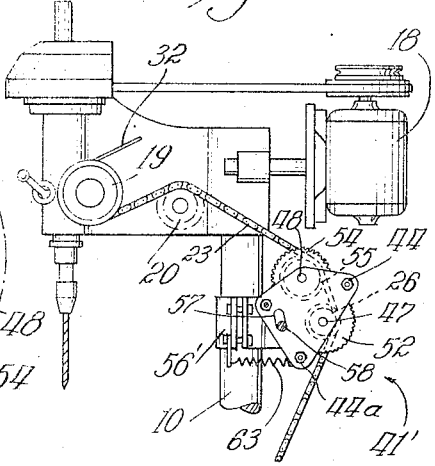
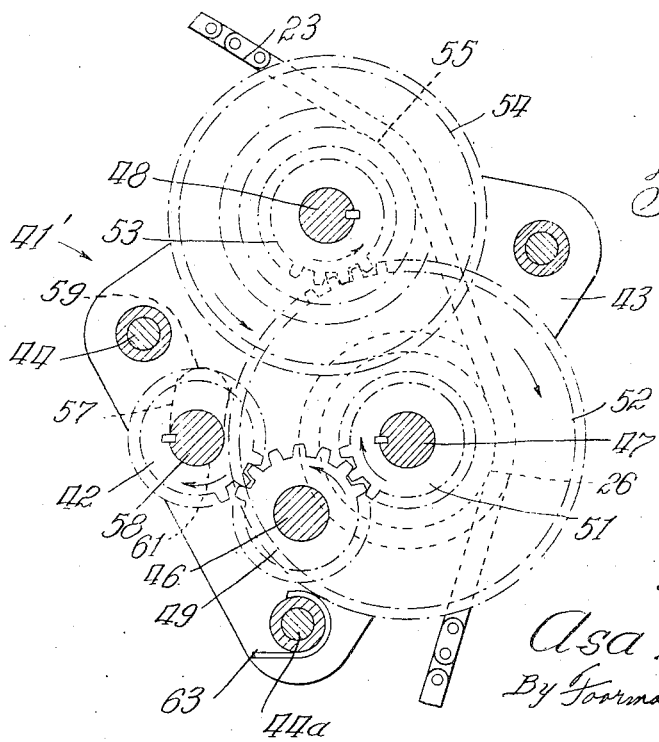
Inventor:
Asa B. Segur Patented Oct. 17, 1944

2,360,725

UNITED STATES PATENT OFFICE 2,360,725

CUTTER FEED-CONTROL MEANS FOR MACHINING APPARATUS

Asa B. Segur, Oak Park, Ill.

Application October 31, 1942, Serial No. 464,117

4 Claims. (Cl. 77—34)

This invention relates generally to machining apparatus of the type having a cutting tool movable relative to a work piece for operating on the same, and in particular to means for determining the rate of feed or advance of the cutting tool relative to the work piece during a machining operation.

In some of the machining devices of the above noted type, the cutting tool is manually advanced relative to the work piece at a rate dependent upon the manual pressure applied to the tool-carrying portion. Thus as an example of this type of machining apparatus, in the usual small drill press the feeding or advance of the drill is generally accomplished by a hand wheel or by a foot treadle. The manual pressure from the hand wheel or foot treadle is applied directly on the drill through a lever or gear system to advance the drill during a drilling operation, this manual pressure being the only force used to act against the cutting load on the drill. As a result in some drilling operations a prolonged application of considerable manual pressure may be required over a relatively large operating movement of the manually operated means, particularly where long bores or holes are drilled. It is apparent, of course, that this procedure is very inconvenient and uncomfortable and tiring to the operator.

A further disadvantage in machining apparatus having manually operated cutter feeding means is found in the fact that all of the attention of the operator is needed at a single machine during a machining operation so as to preclude the operation of a bank of similar machines by a single operator. Also where the feeding of the cutter is accomplished directly by manual pressure considerable experience is necessary to attain a "feel" of the machine to eliminate frequent jamming or stalling of the cutter, due to an erratic application of the manual pressure. These conditions affect both the rate of production as well as the quality of the work and appreciably increases the cost of simple machining operations.

It is an object of this invention, therefore, to provide improved means in a machining device for controlling the rate of feed of the cutting tool during a machining operation.

Another object of this invention is to provide a power feed control attachment for machining apparatus having a usual hand operated cutter feed, in which slip clutch means for transmitting power to the cutter-carrying portion are connected for power transmission by manually operated means.

Yet another object of this invention is to provide a device for controlling the rate of cutter feed in machining apparatus which is adapted to automatically change the rate of cutter feed during a cutting operation in response to the cutting load on the cutter.

A further object of this invention is to provide improved means for advancing the cutting tool in a machining device during a machining operation, which is adapted to simultaneously vary the rate of advance of the cutting tool and the power applied to the tool-carrying portion to advance the tool in response to a manual pressure applied on friction clutch means.

Another object of this invention is to provide means for feeding the cutter of a machining apparatus having a normally hand-operated cutter feeding means, in which a manual pressure is used only to connect corresponding frictionally engageable parts in a friction drive means for the cutter advancing means.

A still further object of this invention is to provide an attachable device for machining apparatus having a usual hand-operated cutter feed to accomplish a power feeding of the cutter, which is relatively inexpensive in cost, simple in construction, efficient in operation, and comprised of but a few number of parts capable of being easily and quickly assembled with the machining apparatus.

A feature of this invention is found in the provision of improved means for controlling the rate of cutter advance in a machining apparatus including slip clutch means having a rotary drum and flexible means wrapped thereabout in a slipping relation, with one end of the flexible means being connected to the cutter carrying portion and an opposite end to a manual lever for applying a tension pressure on the flexible means to frictionally engage the same with the rotary drum. This frictional engagement connects the flexible means for movement by the rotary drum to advance the cutter at a rate dependent upon the degree of tension pressure applied by the manual lever.

Further objects, features, and advantages of this invention will become apparent from the following description when taken in connection with the accompanying drawings in which:

Fig. 3 is a side elevation illustrated similarly to Fig. 2 showing the assembly thereon of a modified embodiment of the invention;

Fig. 4 is a detail view partly in section taken along the line 4—4 in Fig. 5 showing a gear unit utilized in the embodiment of Fig. 3 for controlling the rate of advance of the drill-carrying portion;

Fig. 5 is a sectional view as seen along the line 5—5 in Fig. 4 showing in detail the arrangement of the parts in the gear unit in Fig. 4;

Fig. 6 is illustrated similarly to Fig. 5 and shows a modified arrangement of the flexible means for connecting the gear unit with the drill carrying portion;

Fig. 7 is an elevational view of a drill press illustrated similarly to Fig. 3 showing a modified form of the gear unit in Fig. 3, and Fig. 8 is an elevational sectional view of the gear unit shown in Fig. 7.

Figure 1:
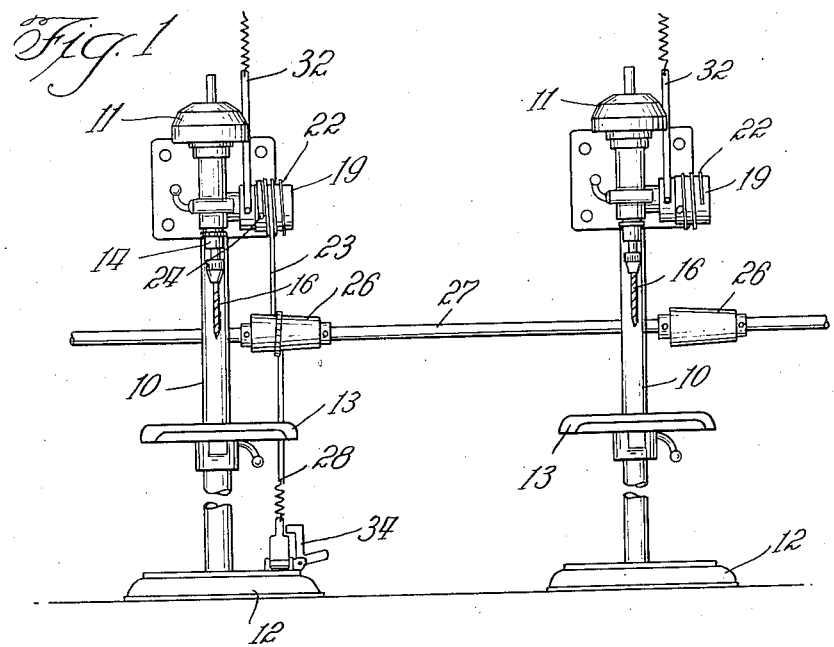
Fig. 1 is a front elevational view of a pair of usual hand operated drill presses arranged side by side showing the invention in an assembly relation therewith.

The invention is illustrated in the drawings as applied to a usual hand-operated drill press. It is to be understood, however, that the invention is not limited in its application to a drill press, but may be used with any machining apparatus in which a cutter and work piece are moved or advanced relative to each other during a machining operation, such as for example a screw machine, milling machine, a lathe or the like. The invention may be further applied to pressing machines of the type adapted for pressing a powder into a capsule, cores into corresponding bores, and in extruding machines where the material to be extruded is forced by suitable continuous pressure means through a die or the like.

In practicing this invention there is provided a slip clutch means comprising a rotatable driving drum supported on a drive shaft extended transversely of the drill press. In place of the hand wheel usually used on a hand operated drill press for advancing the drill-carrying portion and in turn the drill into a work piece, there is mounted on the hand wheel shaft a driven drum or spindle having one end portion of a chain wrapped thereon and connected therewith so as to rotate the driven drum when being unwound. An intermediate portion of the chain is wrapped about the driving drum while the opposite end of the chain is connected to a foot lever which is pivotally supported on the base of the drill press. The chain is arranged relative to the driving drum, the driven drum and the foot lever so that when it is without tension complete slippage occurs between the intermediate chain portion and the driving drum so that the driven drum remains stationary. However, on depressing the foot lever a tension is produced in the chain which draws the intermediate portion of the chain more closely about the driving drum and into frictional engagement therewith. This frictional engagement acts to wind the chain about the driving drum in a direction toward the foot lever and away from the driven drum so that the chain is unwrapped from the driven drum to rotate the same.

Since the pressure applied to the foot lever need only be great enough to create a tension in the chain which produces a frictional engagement of the chain with the driving drum it is very small as compared to the pressure applied through the chain from the driving drum to the driven drum. Since the extent to which the intermediate chain portion frictionally grips the driving drum depends upon the tension produced in the chain by the foot lever a wide variation in the rate of speed of rotation of the driven portion, as well as in the power applied to the driven portion can be obtained by a small variation in the foot lever pressure. The invention further includes means cooperating with the slip clutch means to automatically vary the rate of rotation of, and the power applied on, the driven drum during a drilling operation in direct response to the cutting load on the drill.

With reference to the drawings, in which similar numerals designate corresponding parts in the various views, the invention is shown in Fig. 1 with a pair of like drill presses arranged side by side, and each of which includes a supporting standard 10 having a head 11 at the upper end and a base 12 at the lower end thereof. Adjustably mounted for movement vertically of the standard 10 is a work table 13 for supporting the work piece to be operated on. The head 11 includes a drill-carrying portion 14 having a drill 16 held thereon in a usual manner in a chuck 17. The dril 16 is connected with an operating motor 18 (Fig. 2) mounted on the head 11. With the work piece held on the table 13 the drill 16 is moved relative thereto by rotation of a rotary driven wheel or drum 19 mounted on a shaft 21 and connected with the drill carrying portion 14 to move the same.

The driven drum 19 is formed with peripheral tracks or guiding portions 22 for receiving a chain 23 wrapped thereon within the track portions, the end 24 of the chain being connected to the drum 19 so that the drum is rotated as the chain is unwound therefrom. An intermediate portion of the chain 23 is wrapped around a driving drum 26 mounted on a shaft 27, which is extended transversely of the two drill presses shown in Fig. 1. The shaft 27 may be connected with the motor 18 or to an independent source of power (not shown). The chain 23 between the drums 19 and 26 is passed over an idler pulley 20 carried on the drill head 11. The end 28 of the chain 23 is connected to a foot treadle or lever 29 pivotally supported at 31 on the drill base 12 in a manner such that when it is depressed tension is produced in the chain 23 for a purpose now to be explained.

The driven drum 26 and chain 23 constitute a slip clutch which is adapted to have 100% slip when there is no tension in the chain 23 and to slip to a varying extent in proportion to the tension applied on the chain 23 by the foot lever 29. 100% slippage is facilitated, for no power transmittal through the clutch, by applying a suitable lubricant, such as grease, over the peripheral surface of the driving drum 26, the drum being shown as of a tapered form to prevent the chain 23 from walking or wrapping on itself when it is frictionally engaged by the drum 26. The chain 23 is illustrated as being of sprocket type but it is to be understood that other flexible means such as a cable or rope may be used. When there is substantially no tension in the chain 23 the portion thereof wrapped about the drum 26 is free to slide or slip relative to the driving drum 26 so that no movement is imparted to the chain. The driven drum 19 and the drill-carrying portion 14 are thus stationary.

Figure 2:
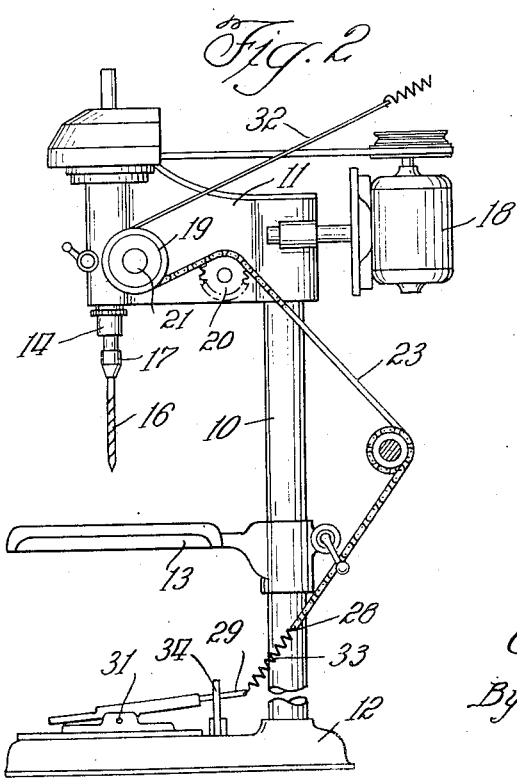
Fig. 2 is a side elevation of a drill press in Fig. 1 showing the relative arrangement of the drill feeding means of this invention thereon.

When it is desired to advance the drill 16 toward the work table 13 the foot lever 29 is pressed downwardly, as viewed in Fig. 2, to place the chain 23 under tension. This tension acts to draw the chain 23 into frictional engagement with the drum 26. As a result of this frictional engagement the chain 23 is moved by the rotating drum 26 to in turn rotate the driven drum 19. In other words when frictional engagement occurs between the chain and the drum 26 it tends to wrap itself about the drum 26 in a direction toward the foot lever 29 and away from the drum 19. The rotation of the drum 19 moves the drill-carrying portion 14 and in turn the drill 16 toward the work table 13 at a rate dependent upon the degree of frictional pressure between the chain 23 and the drum 26. Thus when only a slight tension is produced in the chain 23 appreciable slippage occurs between the chain and the drum 26 so that the chain is continuously moved at a relatively slow rate. As the tension in the chain 23 is increased its rate of movement is correspondingly increased to a speed limit defined by the speed of rotation of the drum 26 when no slippage exists between the chain 23 and the drum 26. Thus any desired rate of feed of the drill 16 is simply accomplished by merely varying the foot pressure on the lever 29. In those instances where the material to be drilled is relatively soft or is easily drilled the foot lever 29 may be depressed rapidly to feed the drill 16 at a maximum rate. However, when a slow rate of drill feed is wanted it is only necessary to gradually depress the foot lever 29.

Because of the frictional gripping between the chain and drum 26 increasing with an increase in tension in the chain 23 it is apparent that the rate of advance of the drill 16 increases simultaneously with an increase in the power transmitted from the drum 26 to the driven drum 19. In other words as the tension in the chain is increased the slippage between the chain and drum 26 is reduced so that a more positive drive of the chain is accomplished. The time in which the drum 19 is rotated in response to an operation of the foot lever 29 can be appreciably reduced by increasing the wrappings of the chain 23 about the drum 26, this increased wrapping of the chain increasing the frictional gripping of the chain 23 with the drum 26 for the same tension produced therein, when a fewer number of wrappings are used, by virtue of the increase in chain area engaging the drum 26.

The pressure applied on the foot lever 29 is utilized only in producing a tension in the chain 23, with the frictional engagement of the chain and the drum 26 resulting from such tension, connecting the drum 19 to the power driven drum 26. The force applied on the drum 19 is thus delivered directly from the driving drum 26 so that the tension in the chain portion between the drums 19 and 26 may be much greater than the tension in the chain portion between the drum 26 and the foot lever 29. In other words the manual pressure or force applied on the foot lever 29 functions only to connect the chain 23 for driving from the drum 26 and is not applied directly in providing for any rotation of the driven drum 19 to advance the drill 16.

On completion of a drilling operation the drill 16 is returned to its rest or starting position by tension means 32 connected to the drum 19 and acting to rotate the drum 19 in a direction opposite to that accomplished by the drum 26. In other words the chain 23 is unwrapped from the drum 19 on frictional engagement of the chain with the drum 26, and is then wrapped or rewound about the drum 19 by the tension means 32, on a removal of the tension on the chain.

In order to mechanically maintain a tension in the chain 23 during a complete drilling operation a spring 33 is connected in that portion of the chain 23 between the drum 26 and the foot lever 29. The pressure of the spring 33 may be made adjustable or calibrated so as to exert a pressure on the chain 23 for a complete drilling operation. Thus when the lever is immediately moved completely down, as viewed in Fig. 2, the pressure exerted by the spring 33 will retain a tension on the chain 23 and in turn a frictional engagement between the chain and the drum 26 so that a progressive or continuous movement of the lever 29 to its fully depressed position to retain such tension, is eliminated. A catch means indicated at 34 may be used to retain the foot lever 29 in a fully depressed position to permit the operator setting one machine and directing his attention to other surrounding machines which may be similarly equipped. A single operator may thus handle a plurality of drill presses, with the catch means 34 being manually released on completion of a drilling operation.

In the modified embodiment of the invention shown in Fig. 3 the rotary drum 26 is operatively assembled as part of a gear unit 41 for pivotal movement therewith relative to a driving gear 42 (Figs. 3 and 4) to change the speed of rotation of the drum 26 in response to tension changes in that portion of the chain 23 located between the drum 26 and the foot treadle 29. The gear unit 41 includes a pair of frame or side plates 43 held in a parallel spaced relation by spacer bolts 44. Extending between the plates 43 and mounted therein in a parallel spaced relation are stub shafts 46, 47 and 48; the shaft 46 carrying an idler gear 49, shaft 47 having gears 51 and 52, and the drum 26 mounted thereon for concurrent rotation, and shaft 48 carrying gears 53 and 54, and a freely rotatable pulley 55 over which the chain 23 passes. The gear unit is pivotally supported at the shaft 47 on a bracket 56 secured to the drill standard 10. Each of the plates 43 is formed with a corresponding arcuate slot 57 to receive a shaft 58 which carries the driving gear 42, the pivotal movement of the gear unit 41 being defined by the engagement of the shaft 58 with opposite corresponding ends 59 and 61 of the slots 57.

As is best shown in Fig. 5 the initial drive or connection of the drum 26 with the shaft 58 is through gears 42, 49, and 51; gears 52, 53, and 54 being also rotated but having no function in this initial connection of the drum 26 with the gears 42, 49, and 51. All of gears 42, 49, and 51 have a 2" pitch diameter, in one form of this embodiment, so that the drum 26 is initially rotated at a maximum speed corresponding to the speed of rotation of the shaft 58. The position of the shaft 58 against the ends 59 of slots 57 providing for the engagement of the gears 42, 49, and 51 is retained by a spring 63 having one end connected to a spacer bolt indicated at 44a and the opposite end connected to a portion of the drill press frame. On depression of the foot lever 29, therefore, to tension the chain 23, the chain tends to be moved at a speed corresponding to this maximum rotational speed of the drum 26 to in turn provide for a maximum rate of advance of the drill carrying portion 14 through the connection of the chain 23 with the driven drum 19. When the lever 29 is depressed too rapidly relative to the advance of the drill 16 through the material or work piece being drilled, the tension in the chain 23 is increased due to the drag or pull by the drill load at one end and the increased pressure manually applied at the other end. This pull in opposite directions at opposite ends of the chain 23 engages the chain 23 more tightly about the drum 26 and tends to straighten the chain out between the idler pulleys 20 and 55, and between the drum 26 and foot treadle 29. The tendency of the chain to straighten between the idler pulleys 20 and 55 is without effect in moving the gear unit 41 because the straightening force over this part of the chain is applied substantially at the pivotal support 47. However, the force or tension tending to straighten out the chain portion between the drum 26 and the foot treadle 29 is applied against the shaft 48 so that it acts on the gear unit 41 through a torque arm substantially equal to the distance between the shaft 48 and the pivotal support 47. When this tension is increased to a point at which the pressure of the spring 63 is no longer capable of retaining the gear unit 41 against the shaft 58 at the slot ends 59, the gear unit 41 is pivoted downwardly, as viewed in Fig. 3, until the shaft 58 is engaged by the slot ends 61. As a result of this pivotal movement the gear 42 is disengaged from the gear 49 and is moved into engagement with the gear 54, which as was above explained, merely idled with the gears 52 and 53 when the drum 26 was rotated at its maximum speed. A driving of the drum 26 at a slower speed is thus accomplished through gears 42, 54, 53 and 52, the pitch diameter of the gear 54, in the above noted form of this embodiment, being 5", while the gear 52 has a pitch diameter of 5½". It is seen, therefore, that the rotational speed of the drum 26 relative to the shaft 58 is appreciably reduced in the ratio of about one to nine. This reduction in the speed of rotation of the drum 26 increases its frictional gripping with the chain 23 and simultaneously reduces the rate of movement of the chain 23, thus providing for a concurrent reduction in the rate of advance of the drill 16 with an increase in the power applied on the drill carrying portion 14 to advance the drill.

When the tension in the chain 23 between the foot lever 29 and the rotary drum 26 is decreased below that value required to overcome the tension of the spring 63, the spring 63 will pivotally move the gear unit 41 upwardly, as viewed in Fig. 3, to disengage gear 42 from gear 54, and reengage gear 42 with the gear 49 to again rotate the drum 26 at its maximum speed. During a single drilling operation, therefore, the rate of advance or feed of the drill 16 is varied simultaneously with the power applied on the drill carrying portion 14 to advance the drill 16, in response to the tension produced in the chain portion between the foot pedal 29 and drum 26. Thus when the material being worked on can be easily drilled, such as for example a work piece formed of wood or a soft metal, the drill will be advanced rapidly by a relatively small amount of foot pressure. However, when drilling is in a hard material the drill will be advanced at a slower rate with an increased manual pressure, with this pressure increasing as the cutting load is increased.

With reference to Fig. 5 it is seen that the pivotal movement of the gear unit 41 providing for the rotation of the drum 26 at a reduced speed is also opposed by a force resulting from the relative arrangement and direction of the rotation of gears 42, 49 and 51 indicated by the arrows in Fig. 5. Thus the power from the shaft 58 is applied through the gears 52, 49 and 51, which constitute a torque arm having a length equal substantially to the distance between the shafts 58 and 47, in a counter-clockwise direction relative to the shaft 47 and cooperates with the spring 63 to urge the slot ends 59 against the shaft 58. As a result the pivotal movement of the gear unit 41 in response to the chain tension produced by the foot lever 29 is somewhat slower than would be the case if this reactive force was in an aiding relation with respect to such tension. An arrangement of the chain 23 providing for this aiding relation is shown in Fig. 6.

The chain 23 (Fig. 6) is passed about the opposite side of the drum 26, as contrasted to its position in Fig. 5, with the gears 42, 49 and 51 being reversely rotated relative to their rotation in Fig. 5 and in the direction indicated by the arrows in Fig. 6. By virtue of this direction of rotation of the gears 42, 49 and 51 the driving action of the shaft 58 is applied therethrough in a clockwise direction relative to the shaft 47 and thus aids the tension produced in the chain to move the slot ends 59 away from the shaft 58. The operation of the chain to straighten out between the friction drum 26 and the foot treadle 29, with an increase in tension, to pivotally move the gear unit 41 is the same in all respects as above explained for Fig. 5. The drill load at which the gear unit 41 will pivotally move in response to the chain tension produced by the foot lever 29 can thus be made variable by simply changing the position of the chain 23 relative to the driving drum 26, with a somewhat greater tension in the chain, and in turn load on the drill, being required to provide for pivotally moving the gear unit 41 in Fig. 5, as compared to the gear unit 41 in Fig. 6.

The embodiment shown in Figs. 7 and 8 is substantially similar in all respects to the embodiment of Figs. 3 and 6 except that the gear unit 41' is inverted relative to the gear unit 41 and the chain 23 arranged to provide for the pivotal movement of the unit 41' entirely in response to the tension in the chain portion between the idler 20 and the friction drum 26 as produced by the load on the drill 16 acting against the friction drum 26. The chain 23 from the idler pulley 20 passes over pulley 55 and about the drum 26 to the foot treadle 29, the gear unit 41' being pivotally supported at the shaft 47 on the bracket 56' secured to the drill standard 10.

The gear unit 41' is held in position with the slot ends 61 against the shaft 58 by the spring 63 to provide for a maximum rotational speed of the drum 26 through gears 42, 49, and 51. As the lead on the drill 16 is increased, the tension in the chain is also increased so that the chain tends to straighten out between the idler pulley 20 and the friction drum 26 and between the idler pulley 55 and the foot treadle 29. Since the force or tension acting to straighten the chain 23 between the idler pulley 55 and the foot treadle 29 is applied substantially at the pivotal support 47 it has substantially no function in pivotally moving the gear unit 41'. The force in the chain tending to straighten the chain between the idler 20 and the friction drum 26, however, is applied on the gear unit 41' at the shaft 48 so that it acts to pivot the gear unit 41 about the shaft 47 in a clockwise direction through a torque arm having a length substantially equal to the distance between the shafts 47 and 48. When this force in the chain between the idler 20 and drum 26 is sufficient to overcome the pressure of the spring 63 the gear unit 41' is pivotally moved in a clockwise direction about the shaft 47 to disengage the gears 42 and 49, and to engage gear 42 and gear 54 whereby to reduce the rotational speed of the drum 26 concurrently with an increase in the frictional gripping of the drum with the chain. This action in turn decreases the advance of the drill-carrying portion 14 and increases the power applied thereon in a manner similar to that explained above for the embodiment of Fig. 3.

The pivotal movement of the gear unit 41' to rotate the drum 26 at a reduced speed is aided by the relative arrangement of the gears and their direction of rotation as indicated by the arrows in Fig. 8. With this arrangement the force from the shaft 58 is applied on the gear unit 41' through a torque arm having a length equal approximately to the distance between the shafts 47 and 58 and acts to move the gear unit 41' in a clockwise direction relative to the shaft 47. Should the load on the drill 16 decrease below that load which provided for the pivotal clockwise movement of the gear unit 41', the unit 41' is returned to its initial position by the action of the spring 63, so that pivotal movement of the gear unit 41' in reversed directions to control the rate of advance of the drill in response to the tension in the chain portion between the idler 20 and drum 26, as produced by the load on the drill, takes place automatically during a single drilling operation.

From a consideration of the above description, therefore, it is seen that the invention provides means for controlling the advance or feed of a normally hand-operated cutter in which a manual pressure is utilized to merely connect the drill-carrying portion to a power source, with the transmittal of power varying directly with a variation of the manual pressure applied, or with the load encountered by the cutter during a cutting operation. To eliminate stalling of the cutting tool, means are provided to automatically vary the rate of advance of the cutting tool simultaneously with the power applied to move the same against its load during a single machining operation. As is clear from the description and drawings the invention is readily applicable as an attachable device for a usual hand drill press to provide a relatively inexpensive but efficient power feed control for the drill. However, it may be used equally well as an attachable device on any machining apparatus having a normally hand-operated cutter.

Although this invention has been described with reference to several preferred embodiments thereof it is to be understood that it is not to be so limited, since modifications, alterations, and changes can be made therein which are within the full intended scope of the invention as defined by the appended claims.

I claim:

1. In apparatus having a tool portion for performing a machining operation on a work portion, with said two portions being relatively movable, the means for controlling the rate of movement of one of said portions relative to the other portion in response to the load produced on said tool portion during said machining operation including a movable actuating member connected with said one portion to move the same, a manually operated lever, pivoted gear means including a friction member, a rotary driving member for said gear means, said gear means being pivotally movable relative to said rotary driving member to change the driving ratio between said driving member and said friction member, means connecting said friction member, manual lever, and actuating member, with said friction member being arranged between said manual lever and actuating member, with operation of said manual lever placing said connecting means under tension to frictionally engage said friction member and actuate said actuating member to move said one portion, said frictional engagement being increased with an increase in the cutting load on said tool portion to provide for a pivotal movement of said gear means to reduce the rotational speed of said friction member and in turn the speed of movement of said connecting means to decrease the rate of relative movement between said two portions.

2. In machining apparatus having a tool portion for operating on a work portion, with said two portions being relatively movable, the means for advancing one of said portions relative to the other in response to the cutting load on said tool portion including a rotary member for driving said one portion, driving means for said rotary member, rotary means connected with said driving means and pivotally movable relative thereto, with pivotal movement of said rotary means changing the driving ratio between said driving means and rotary means, and flexible means connecting said rotary member and rotary means, with said connecting means being adapted to have a tension produced therein to provide for a frictional gripping thereof with said rotary means to operate said rotary member, said tension being increased with an increase in the load on said tool portion and acting on said rotary means, when increased to a certain value, to pivotally move the same to decrease the rate of advance of said one portion relative to the other portion.

3. In machining apparatus having a tool portion for operating on a work portion, with said two portions being relatively movable, the means for automatically varying the advance of one of said portions relative to the other portion during a machining operation in response to the cutting load on said tool portion including an actuating member for said one portion, rotary driving means, a gear unit including a rotary member, and a pair of gear members selectively connectible with said driving means to vary the rotational speed of said rotary member, means supporting said gear unit for pivotal movement relative to said driving means, and flexible means operatively connecting said actuating portion and rotary member and frictionally connected with said rotary member on having a tension produced therein, said tension being increased with an increase in the cutting load on said tool portion, and acting on said gear unit at a certain cutting load to pivotally move said gear unit to change the connection of said driving means from one of said gear members to the other of said gear members.

4. In machining apparatus having a tool portion for operating on a work portion, with said two portions being relatively movable, the means for automatically varying the advance of one of said portions relative to the other portions during a machining operation including an actuating member for said one portion, rotary driving means, a gear unit including a rotary member, and a pair of gear members selectively connectible with said driving means to vary the rotational speed of said rotary member, means supporting said gear unit for pivotal movement relative to said driving means, flexible means having one end connected with said actuating portion and an intermediate portion wrapped about said rotary member in a slipping relation, a foot treadle, with said flexible means having an opposite end thereof connected with said foot treadle, with operation of said treadle in one direction producing a tension in said flexible means to frictionally engage the same with said rotary member to drive said actuating portion, with an increase in said tension above a certain pressure acting to pivotally move said gear unit to change the connection of said driving means from one of said gear members to the other of said gear members.

ASA B. SEGUR.